W. Baxter
Steam Engine.

Nº 95637.  Patented Oct. 12. 1869.

Witnesses

Inventor.
Wm Baxter
by A Pollok
his atty

United States Patent Office.

WILLIAM BAXTER, OF NEWARK, NEW JERSEY, ASSIGNOR TO WILLIAM D. RUSSELL, OF SAME PLACE.

Letters Patent No. 95,637, dated October 12, 1869.

IMPROVEMENT IN STEAM-ENGINES.

The Schedule referred to in these Letters Patent and making part of the same.

To whom it may concern:

Be it known that I, WILLIAM BAXTER, of Newark, in the county of Essex, and State of New Jersey, have invented certain new and useful Improvements in Steam-Engines; and I hereby declare the following to be a full, clear, and exact description of the same, reference being had to the accompanying drawings, in which—

Figure 1:
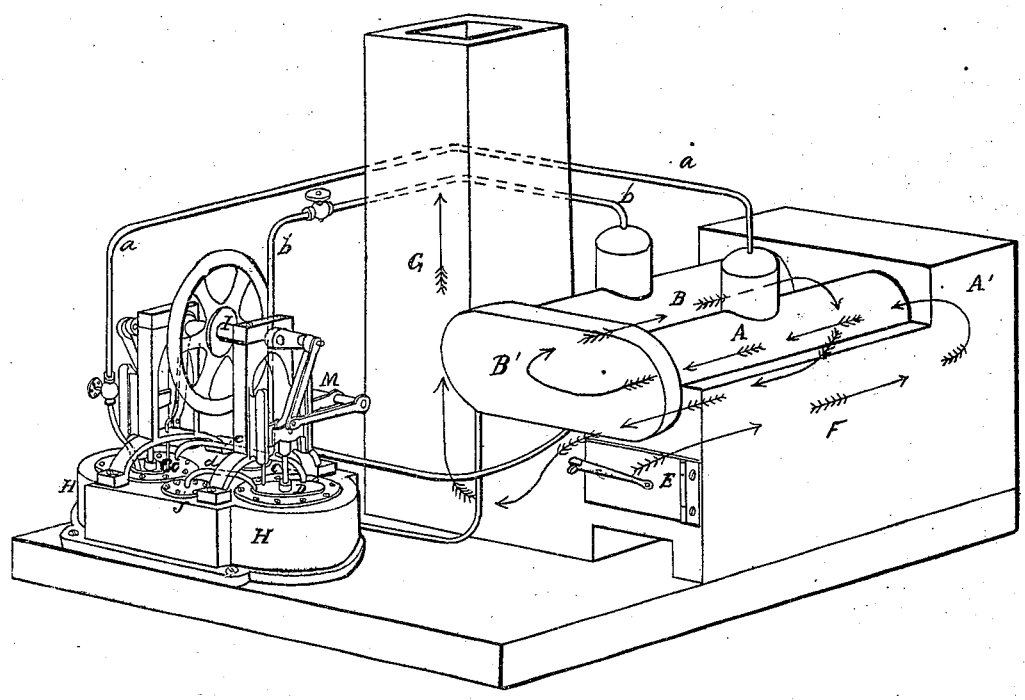
Figure 1 is a perspective view of a double engine, organized in accordance with my invention.

The object of my invention is to utilize as far as possible, for the production of power, all the heat and steam which, in ordinary engines, are, to a great extent, wasted.

To this end, I combine, in one, a high and a low-pressure engine; and I use two boilers, the low-pressure boiler being heated by the waste heat from the high-pressure boiler, which alone is subjected to the direct action of the fire, so that all the available heat may be taken up in generating steam, or in heating water.

In connection with the high-pressure boiler, or a series of such boilers, I use one or more high-pressure steam-cylinders, which are supplied with steam from said boilers, and one or more low-pressure steam-cylinders, into which the steam from the first-named cylinders, after being expanded to the desired pressure, is exhausted, and is therein further expanded until it reaches the pressure of the steam in the low-pressure boiler or boilers, from which boilers the steam then enters the low-pressure cylinders in conjunction with the exhaust steam. Thus, the waste heat from the first boiler is utilized to generate steam in the second, and the high-pressure steam, after expanding and following up the piston in the first cylinder, is exhausted into the second, and, in conjunction with the low-pressure steam, is utilized to actuate the piston of the latter cylinder.

The nature of my invention will be readily understood by reference to the accompanying drawings.

The first or high-pressure boiler is represented at A; the second or low-pressure boiler at B.

C is the smaller or high-pressure cylinder; and D, the larger or low-pressure cylinder. The pistons of the two cylinders should have an equal stroke, but the piston of the low-pressure cylinder should, preferably, have a diameter twice as great as that of the piston of the smaller cylinder.

The cylinders, boilers, &c., are provided with the necessary valves, condenser, pumps, and pipes, and thus form a complete double engine.

The fire-door E and fire-chamber F are located under the high-pressure boiler only, and the course followed by the heat and products of combustion, in passing to the stack G, is indicated by the arrow. They first pass under the boiler A, to the rear of the same; then into a chamber, A'; and thence back through one or more longitudinal flues in the boiler. Issuing from the flue or flues into a box or chamber, B', they then enter flues running through the boiler B from front to rear, and from such flues they pass down under the boiler B, and out through the smoke-stack. The waste heat from the first boiler is thus employed to heat the second, and consequently, is utilized as far as possible for the production of power.

The cylinders C and D, with which the high-pressure and low-pressure boilers are respectively connected, are secured or held in steam-chambers or jackets H, so as to be surrounded by steam at the same temperature with that which enters them, as described in Letters Patent granted to me, on the 27th October, 1868, and reissued April 20, 1869; and, as above stated, the diameter of the piston of the high-pressure cylinder is about one-half that of the low-pressure cylinder.

The arrangement of the steam-valves, cut-off valves, &c., may be that described in my patent, dated October 27, 1868, and reissued April 13, 1869, or any other ordinary or suitable arrangement may be employed.

Both valve and piston-rods are connected with the driving-shaft I, in the usual manner.

The high-pressure steam-pipe, from boiler A to cylinder C, is represented at $a$.

The low-pressure steam-pipe $b$ leads from boiler B into a branch pipe, $c$, which extends from the high-pressure to the low-pressure cylinder, and constitutes the channel through which the exhaust steam of the former is led into the latter.

From the low-pressure cylinder D an exhaust-pipe, $d$, leads into the condenser J.

The operation of the parts, thus described, is as follows:

Steam from the high-pressure boiler, through the pipe $a$, is admitted into cylinder C, and, after being cut off and expanded down to the pressure that may be desired, is then exhausted through the pipe $c$ into the low-pressure cylinder D. In order to prevent the exhaust steam from passing into the boiler B, the pipe $b$ is provided with a check-valve, of any ordinary or suitable construction, which, while preventing the passage through said pipe of the exhaust steam, will allow the steam to pass from the low-pressure boiler to the low-pressure cylinder, as soon as the expansion of the exhaust steam reaches the point at which it would draw the steam from said low-pressure boiler. When this point is attained, the steam from the low-pressure boiler will enter the low-pressure cylinder in conjunction with the exhaust steam, and will follow up the piston. The steam may be cut off and still further expanded in the second cylinder, and then can be exhausted into the condenser, through the pipe $d$.

It will be seen, that under this arrangement of boilers and engines, all the heat above 100° Fahrenheit can be converted into power, minus the radiation, that cannot be prevented, even with the use of the best non-conductors.

Figure 2:
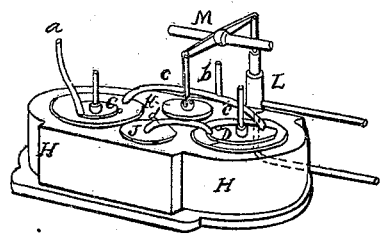
Figure 2 is a like view of a detached portion of the same, representing more clearly the connections of the high and low-pressure cylinders, condenser, and pump.

The arrangement of the air and feed-pumps is shown at K L, fig. 2, the piston-rods of the two being connected with a rock-shaft, M, which is actuated as represented in fig. 1, or in any other suitable manner.

In all cases, the water, as indicated in the drawings, should first enter the lowest-pressure boiler, from which it can be pumped into the higher-pressure boilers.

It will be seen from the foregoing, that the principal feature of my invention consists in the use of varied pressures of steam obtained from separate boilers; that is to say, high-pressure steam is first introduced and expanded down to the desired point, and then low-pressure steam is introduced, which follows up the piston with whatever pressure may be obtained from the low-pressure boiler. The high-pressure boiler may have a pressure of from eighty-five to one hundred pounds per square inch, and the low-pressure boiler a pressure of from one to five pounds.

Suppose, for instance, the first boiler to have a pressure of one hundred pounds to the square inch. In consequence of the high temperature of this boiler, the heat cannot all be taken up, but will pass off at, say 600° Fahrenheit. By interposing the second boiler, however, and getting a pressure in that of one pound per square inch, said heat will be drawn down to about 212° Fahrenheit. If it be desired to bring it down still further, and to carry the steam in the low-pressure boiler below atmospheric pressure, then the heat can be taken up down to the point at which water ceases to boil in a vacuum.

I have described, in illustration of my invention, what I consider to be, on the whole, the best arrangement for working this system of engines and boilers. But it will be readily seen that the same could be extended to a series of three or more, and that the construction and arrangement of the parts can be greatly varied to adapt the system to the different uses for which it may be designed. The invention can also be carried into effect by using one boiler only, dividing the same into sections, and making the high-pressure steam at the firing-end, (as, for instance, in a locomotive-boiler,) and the low-pressure steam at the further end. The high-pressure steam could be let into a cylinder, cutting it off short and expanding it down to a point at which the steam would flow in from the low-pressure end of the boiler, and finish the stroke. This arrangement, however, might be open to the objection of keeping the cylinder at too low a temperature.

Having now described my invention, and the manner in which the same is or may be carried into effect,

What I claim, and desire to secure by Letters Patent, is—

1. The combination, with each of two or more steam-cylinders, which operate at different pressure, and exhaust one into the other, as specified, of a boiler, which shall generate steam at a pressure corresponding with that at which its cylinders are to work, substantially as herein described.

2. The combination, with a series of two or more engines, working at different pressures, and united so that each cylinder shall exhaust into the cylinder having the next lower pressure, of a series of two or more boilers, arranged substantially as herein described, whereby the fire, and other products of combustion, shall pass from one boiler to the other, and produce in said boilers pressures corresponding with those in their respective cylinders, substantially as set forth.

3. In a series of two or more engines, combined with two or more boilers, operating at different pressures, as described, driving the piston of the second or subsequent cylinder by means of steam generated in that boiler having a corresponding pressure with said cylinder, in conjunction with the exhaust steam from the cylinder immediately preceding, the one supply of steam being auxiliary to and complementary of the other, as set forth.

4. Feeding the water to a series of two or more boilers, generating steam at different pressures, and united, as described, by causing the water to first enter the lowest-pressure boiler, and feeding it thence to the higher-pressure boilers, substantially as herein specified.

5. The herein-described arrangement of the high and low-pressure engines, and their corresponding boilers or steam-generators, the same being constructed and connected together, substantially as shown and set forth.

In testimony whereof, I have signed my name to this specification, before two subscribing witnesses.

WM. BAXTER.

Witnesses:
   WM. D. RUSSELL,
   R. W. BALL.